US008066430B2

(12) United States Patent
Kordic et al.

(10) Patent No.: US 8,066,430 B2
(45) Date of Patent: Nov. 29, 2011

(54) SEMICONDUCTOR SUBSTRATE TEMPERATURE DETERMINATION (75) Inventors: Srdjan Kordic, Biviers (FR); Meindert M. Lunenborg, Crolles (FR); Jean-Philippe Jacquemin, Crolles (FR)

(73) Assignee: NXP B.V., Eindhoven (NL)

( * ) Notice: Subject to any disclaimer, the term of this patent is extended or adjusted under 35 U.S.C. 154(b) by 659 days.

(21) Appl. No.: 12/297,271

(22) PCT Filed: Apr. 19, 2007

(86) PCT No.: PCT/IB2007/051408
§ 371 (c)(1),
(2), (4) Date: Oct. 27, 2008

(87) PCT Pub. No.: WO2007/122560
PCT Pub. Date: Nov. 1, 2007

(65) Prior Publication Data
US 2009/0175313 A1 Jul. 9, 2009

(30) Foreign Application Priority Data
Apr. 20, 2006 (EP) ..................... 06300383

(51) Int. Cl.
G01K 7/32 (2006.01)
G01K 7/34 (2006.01)
H01L 21/66 (2006.01)
(52) U.S. Cl. .............. 374/117; 374/E7.035; 438/17
(58) Field of Classification Search ............... 374/117, 374/166, 178, E7.035, E7.036; 257/467, 257/470; 438/14, 17, 18, 54, 55
See application file for complete search history.

(56) References Cited

U.S. PATENT DOCUMENTS

| 5,821,599 A * | 10/1998 | Rupp ......................... 257/467 |
| 6,773,158 B2 | 8/2004 | Koshimizu |
| 6,794,310 B1 | 9/2004 | Miller et al. |
| 6,864,108 B1 * | 3/2005 | Papa Rao et al. .............. 438/14 |
| 7,462,922 B2 * | 12/2008 | Mori et al. ................... 257/470 |
| 7,803,644 B2 * | 9/2010 | Balch et al. .................. 438/18 |
| 7,993,942 B2 * | 8/2011 | Kurita ........................ 438/18 |
| 2007/0170170 A1 * | 7/2007 | Sata et al. .................... 219/497 |

FOREIGN PATENT DOCUMENTS

| JP | 58145141 A * | 8/1983 |
| JP | 2010192649 A * | 9/2010 |
| WO | WO 2007119359 A1 * | 10/2007 |

* cited by examiner

Primary Examiner — R. A. Smith (57) ABSTRACT

The invention provides a method and a device for determining the temperature of a semiconductor substrate. A resonance circuit (110) is provided on the semiconductor substrate and is formed by a junction capacitor (11) and an inductor (12). The substrate is placed on a holder and the resonance circuit (110) is irradiated with electromagnetic energy of an electromagnetic field (5) generated by a radiation device (200). A resonance frequency of the resonance circuit (110) is determined by detecting an effect of the resonance circuit (110) on the irradiated electromagnetic field (5), and a temperature of the semiconductor substrate is determined as a function of the resonance frequency. The method and device according to the invention provide for a more accurate determination of the temperature of the semiconductor substrate due to an increased sensitivity to the temperature of the junction capacitor (11).

13 Claims, 8 Drawing Sheets

SEMICONDUCTOR SUBSTRATE TEMPERATURE DETERMINATION

The invention relates to a method and a device for determining the temperature of a semiconductor substrate.

The temperature of a semiconductor substrate or wafer is an important parameter in integrated circuit (IC) processing steps, such as for example dielectric etch, physical vapor deposition (PVD) of Cu barrier and Cu seed layers, and chemical vapor deposition (CVD) of dielectric layers. During deposition or etching processing steps, the temperature of the semiconductor wafer increases as a result of an energy transfer to the semiconductor wafer caused by atoms and/or ions that impinge on a surface of the semiconductor wafer and/or by condensation of material on the surface of the semiconductor wafer. Furthermore, the temperature of the semiconductor wafer determines the performance of the deposition or etching processing steps. An active feedback loop is usually in place in the processing equipment to keep the wafer temperature at an optimum value by controlling the temperature of a holder on which the semiconductor wafer is positioned.

The temperature of the semiconductor wafer can be determined during a processing step by thermocouples or infrared techniques. Both techniques are not accurate enough to ensure adequate temperature determination and temperature control of the semiconductor wafer. For example, the thermocouple must have a good thermal contact to the wafer to ensure an accurate temperature determination. However the quality of the thermal contact between the wafer and the thermocouple varies from wafer to wafer depending on the surface of backside of the semiconductor wafer, such as roughness, and on the accuracy of the thermocouple placement in the holder or chuck of the processing equipment. These conditions are also not reproducible, resulting in irreproducible temperature determination and inadequate temperature control of the semiconductor wafer.

To overcome the aforementioned problems, U.S. Pat. No. 6,773,158 discloses a method for measuring the temperature of a semiconductor substrate or wafer during processing thereof in a processing chamber by means of a resonance circuit formed on the substrate surface. The resonance circuit is energized by an electromagnetic field of a radiation device and disturbances in the electromagnetic field are detected to determine the resonance frequency of the resonance circuit, wherein the resonance frequency is a function of the temperature of the substrate. The resonance circuit comprises a coil and a dielectric capacitor, wherein the coil is formed by a pattern of a conductive layer, and the dielectric capacitor is formed by a stack of a second conducting layer, a dielectric layer and the conductive layer which is also part of the coil. When the temperature of the substrate changes, the capacitance value of the dielectric capacitor changes accordingly. However, a disadvantage of this resonance circuit is that the sensitivity of the dielectric capacitance value to the temperature is not sufficient to achieve an accurate determination of the substrate temperature.

It is an object of the invention to provide a method and a device for determining the temperature of a semiconductor substrate with an improved accuracy. The invention provides a method as claimed in claim 1. Advantageous embodiments are defined by the dependent claims.

The method for determining the temperature of a semiconductor substrate according to the invention comprises the steps of:

providing a resonance circuit on the semiconductor substrate, the resonance circuit comprising a junction capacitor and an inductor;

irradiating the resonance circuit with electromagnetic energy of an electromagnetic field generated by a radiation device;

determining a resonance frequency of the resonance circuit by detecting an effect of the resonance circuit on the electromagnetic field; and determining a temperature for the semiconductor substrate as a function of said resonance frequency.

By providing a resonance circuit with a junction capacitor, the sensitivity of the resonance frequency to the temperature of the semiconductor substrate increases, thereby providing a more accurate determination of the temperature of the semiconductor substrate.

In an embodiment of the method according to the invention the substrate is placed on a holder that comprises the radiation device before irradiating the resonance circuit with electromagnetic energy, which guarantees an accurate determination of the resonance frequency because the radiation device is close to the substrate.

In another embodiment of the method according to the invention the radiation device comprises an actuating coil having a diameter that is larger than a distance between a top surface of the semiconductor substrate and the actuating coil, which allows for an optimum operation of the actuating coil.

In another embodiment of the method according to the invention the radiation device comprises an actuating coil that extends over at least two resonance circuits. This provides for an effective determination of the temperature of a region of the substrate that is occupied by the at least two resonance circuits.

In an embodiment of the method according to the invention the temperature of the semiconductor substrate is determined during processing of the semiconductor substrate in a semiconductor processing apparatus, and the resonance frequency of the resonance circuit differs from a frequency generated by the semiconductor processing apparatus. In this way the appropriate signals can be simply filtered, thereby preventing any interference from signals produced by the semiconductor apparatus.

In an embodiment of the method according to the invention the junction capacitor is reverse biased, thereby preventing the junction of the junction capacitor from being forward biased, which would result in non-linear effects in the resonance circuit. Advantageously, the reverse bias is provided by the radiation device.

The device for measuring the temperature of a semiconductor substrate according to the invention comprises a resonance circuit on a semiconductor substrate with a resonance frequency that is sensitive to temperature variations of the semiconductor substrate, in which the resonance circuit comprises a junction capacitor and an inductor. By providing the resonance circuit with the junction capacitor, the sensitivity of the resonance frequency to the temperature of the semiconductor substrate increases, thereby providing a more accurate determination of the temperature of the semiconductor substrate.

In an embodiment of the device according to the invention the junction capacitor and the inductor are formed by a first region of a first semiconductor type adjoining a second region of a second semiconductor type, which is opposite to the first semiconductor type. In this way the device is advantageously formed in only one semiconductor layer, which can be easily integrated into the semiconductor substrate using simple and standard processing steps. In a preferred embodiment the first region is at the surface of the semiconductor substrate and comprises, seen in projection at the surface of the substrate, a first portion, a second portion and connection portions wherein the second portion is wider than the first portion and wherein both portions are connected to each other at their respective ends via the connection portions. This embodiment provides for an optimum configuration of the resonance circuit by adding a degree of freedom to independently optimize the junction capacitor and the inductor. Optionally, a further resonance circuit is provided in between the first portion, the second portion and the connection portions of the first region, thereby increasing the inductance and capacitance values.

In an embodiment of the device according to the invention the junction capacitor comprises a first and a second junction capacitor with a common region of a first semiconductor type, wherein the first junction capacitor is formed by the common region and a first capacitor region of a second semiconductor type, opposite to the first semiconductor type, and wherein the second junction capacitor is formed by the common region and a second capacitor region of the second semiconductor type. This advantageously increases the junction area of the junction capacitor without increasing the occupied area of the junction capacitor itself.

In a preferred embodiment of the device according to the invention the semiconductor substrate comprises a wafer having products separated by a scribe line and wherein the resonance circuit is formed in the scribe line. In this way the resonance circuit does not occupy any active or IC area.

These and other aspects of the invention will be further elucidated and described with reference to the drawings, in which.

The Figures are not drawn to scale. In general, identical components are denoted by the same reference numerals in the figures.

Figure 1:
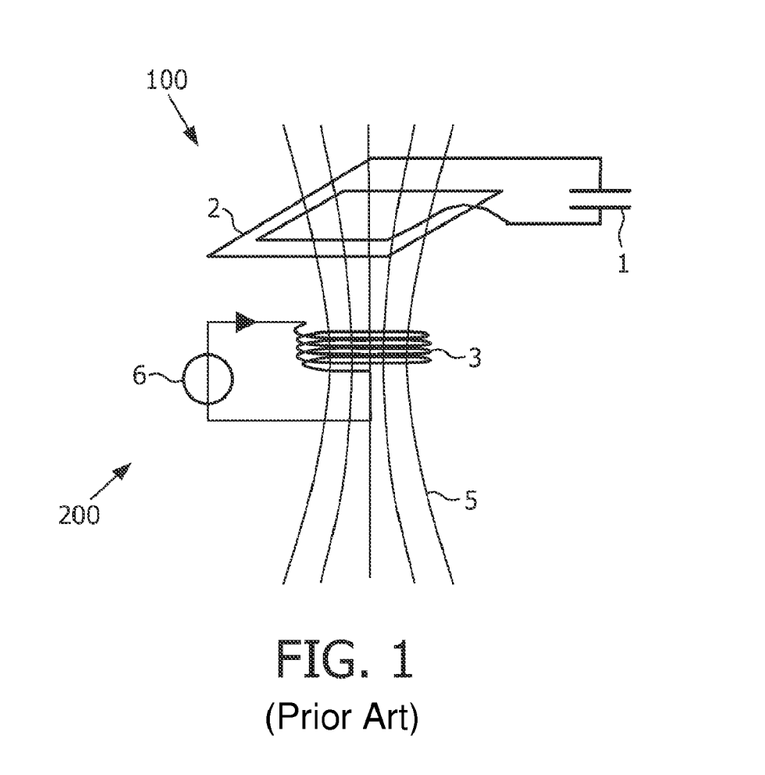
FIG. 1 is a diagrammatic view of a method according to the prior art.
Figure 2:
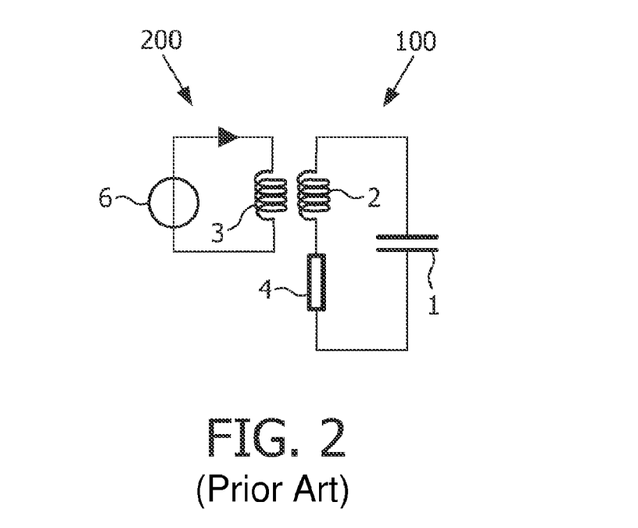
FIG. 2 is an electrical scheme of a method according to the prior art.

FIG. 1 illustrates a diagrammatic view of an embodiment according to the prior art and FIG. 2 shows the corresponding electrical scheme. A passive resonance circuit 100 comprises a capacitor 1 and an inductor 2, in this case a flat coil, that are electrically connected with, in this case, a series resistor 4. The resonance circuit 100 is provided on a semiconductor substrate (not shown in this Figure) and has a resonance frequency that depends on the temperature of the semiconductor substrate. The resonance circuit 100 is actuated by an actuator circuit 200, which generates an electromagnetic field 5 by, for example, applying a voltage over an actuating coil 3 with a voltage source 6. The resonance frequency of the resonance circuit 100, and hence the temperature of the semiconductor substrate, is determined by measuring the impedance of the actuator circuit 200 which depends on, amongst others, the resonance frequency of the resonance circuit 100.

Figure 3A:
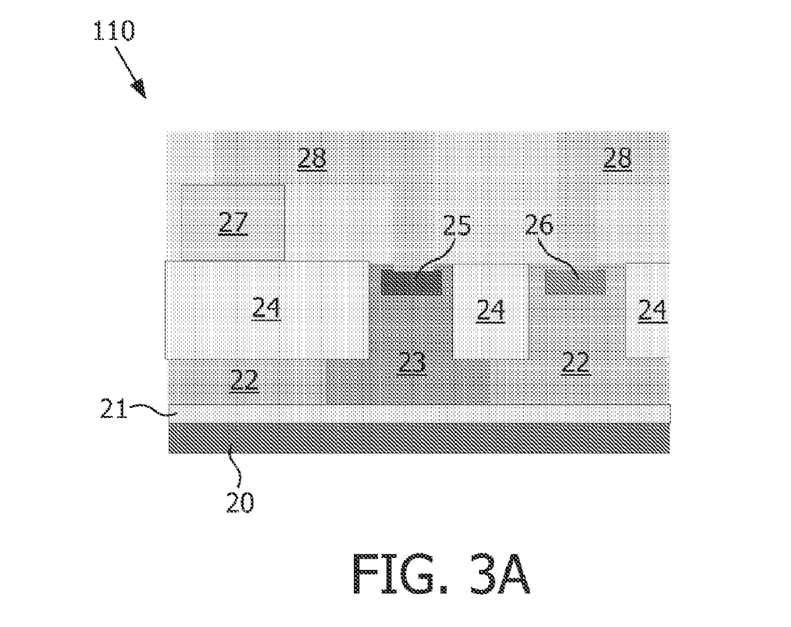
FIGS. 3A, 3B are diagrammatic cross-sectional views illustrating an embodiment of the method according to the invention.
Figure 3B:
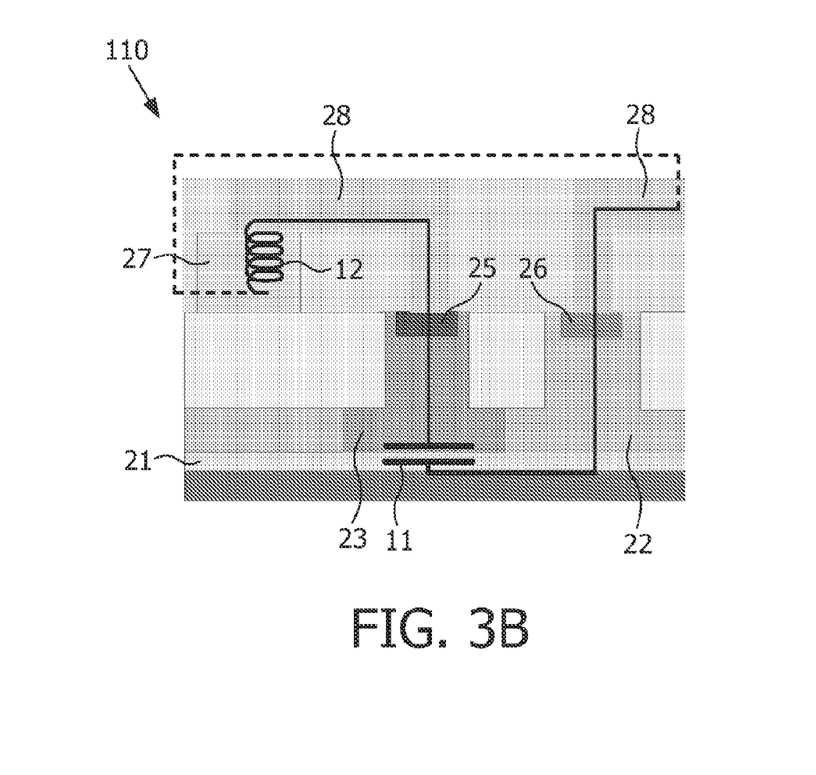

FIGS. 3A, 3B are diagrammatic cross-sectional views illustrating an embodiment of the method according to the invention, wherein in FIG. 3B a diagrammatic electrical scheme is added to the cross-sectional view illustrating various electrical components that are comprised in a resonance circuit 110 according to the invention. The resonance circuit 110, as is shown in FIG. 3A, is formed on a p-type substrate region 20 on which an n-type region 21 is provided, for example by epitaxy. An n-type well region 22 and a p-type well region 23 are provided in the n-type region 21, while shallow trench isolation (STI) regions 24 separate a top portion of the n-type well region 22 and the p-type well region 23. At the surface of the p-type well region 23 a p-type contact region 25 is provided, which has a higher dopant level than the p-type well region 23. Similarly, at the surface of the n-type well region 22 an n-type contact region 26 is provided, which has a higher dopant level than the n-type well region 22. The p-type contact region 25 and the n-type contact region 26 provide for a low resistance connection to a conductive region 28, which comprises, for example, tungsten. The conductive region 28 contacts a polysilicon layer 27, which, in this case, is provided on a portion of the STI region 24. The polysilicon layer 27 has, for example, a winding pattern seen in a plane perpendicular to the cross-sectional view of FIG. 3A and parallel to the surface of the substrate. It should be noted that the resonance circuit 110 is not electrically connected to any other circuit elements or supply lines on the semiconductor substrate, and is as such a separate circuit which is not supplied by a voltage or current originating from circuit elements on the semiconductor substrate.

The resonance circuit 110 comprises a junction capacitor 11 and a flat coil 12, as is illustrated in FIG. 3B. The junction capacitor 11 is formed by the junction between the p-type well region 23 and the n-type region 21, and the flat coil 12 is formed by the winding pattern of the polysilicon layer 27. It should be noted that the flat coil should comprise a conductive layer and hence it is also possible to apply another conductive layer, such as for example aluminum or tungsten, or any combination thereof, to replace or combine with the polysilicon layer 27 as part of the flat coil 12. The junction capacitor 11 is on the side of the n-type region 21 electrically connected to a first side of the flat coil 12 via the n-type well region 22, the n-type contact region 26 and the conductive region 28, which is in a plane outside the cross-sectional view of FIG. 3B and therefore indicated with a dashed line in FIG. 3B. The junction capacitor 11 is on the side of the p-type well region 23 electrically connected to a second side of the flat coil 2 via the p-type contact region 25 and the conductive region 28.

Figure 4:
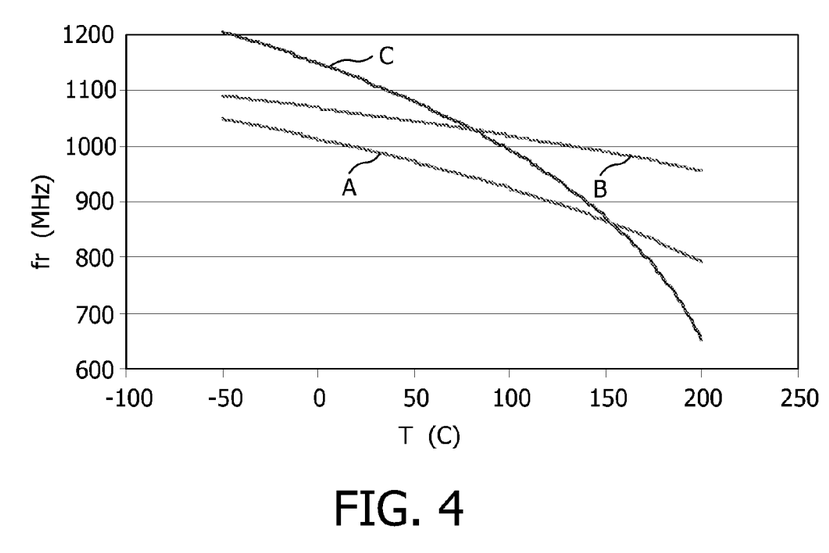
FIG. 4 is a graphical representation of the dependency of the resonance frequency on the temperature of the substrate.

The inductance value of the flat coil 12 depends on, amongst others, the surface area covered by the flat coil 12 and the number of windings. The capacitance value of the junction capacitor 11, which in this case is an unbiased pn-junction, depends, amongst others, on the total junction area and the dopant levels of the p-type well region 23 and the n-type region 21. Furthermore, the capacitance value of the junction capacitor 11 depends strongly on the temperature of the semiconductor substrate. Because the resonance frequency of the resonance circuit 110 depends on, amongst others, the capacitance value of the junction capacitor 11, also the resonance frequency is a function of the temperature of the semiconductor substrate. FIG. 4 illustrates the dependency of the resonance frequency of the resonance circuit 110 on the temperature of the semiconductor substrate. In this case the dopant level of the n-type region 21 is $10^{14}$ cm$^{-3}$ and the dopant level of the p-type well region 23 is $10^{14}$ cm$^{-3}$, $10^{16}$ cm$^{-3}$ and $10^{19}$ cm$^{-3}$ for curves A, B and C respectively. It can be seen from FIG. 4 that the resonance frequency of the resonance circuit 110 is a strong function of the temperature. In the case that the dopant level on both sides of the pn-junction of the junction capacitor 11 is $10^{14}$ cm$^{-3}$, the resonance frequency changes by 80% in a temperature range from −50° C. to +200° C., corresponding to a temperature dependence of the junction capacitor of 0.96%/° C., which a factor of 30 higher than the temperature dependence of a dielectric capacitor. The response of the resonance frequency to the temperature of the semiconductor substrate can, in this example, be optimally tuned by choosing the capacitance value of the junction capacitor 11 and the inductance value of the flat coil 12.

Figure 5:
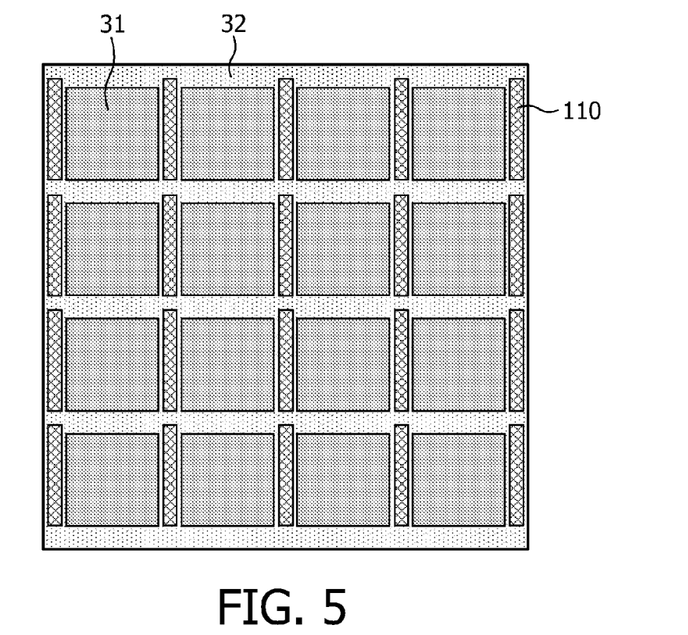
FIGS. 5-8 and 12 are schematic top views illustrating embodiments of the method according to the invention.

FIG. 5 illustrates a top view of a part of a semiconductor wafer comprising a regular pattern of integrated circuits (IC) or products 31 spaced by a sawing lane or scribe line 32, which is required for separating the products 31 from the wafer by sawing through the scribe line 32.

Figure 6:
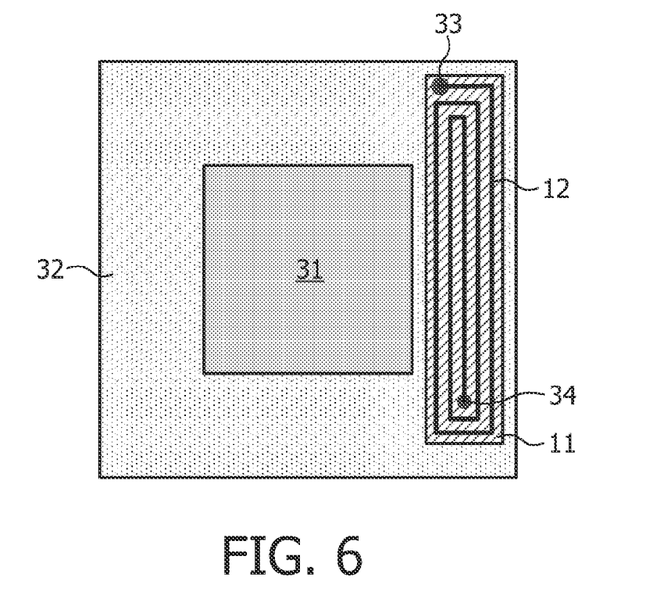

The resonance circuit 110 is, in this case, repeatedly placed in the scribe line 32, which prevents an increase of required wafer area thereby advantageously saving area on the wafer. FIG. 6 shows, in a top view, an example of the placement of the resonance circuit 110 in the scribe line 32 of the wafer. The flat coil 12 is placed in the scribe line 32 with a pattern winding at one side of the product 31 and extending over the junction capacitor 11. The flat coil 12 is electrically connected to the junction capacitor 11 by contacts 33,34.

Figure 7:
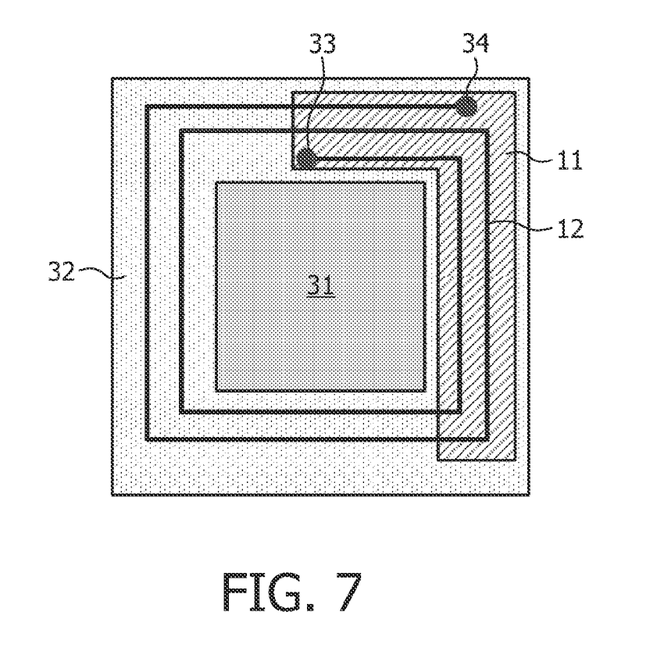

FIG. 7 shows, in a top view, another example of the placement of the resonance circuit 110 in the scribe line 32 of the wafer. The flat coil 12 is placed in the scribe line 32 with a pattern winding around the product 31. Also in this case, the flat coil 12 is electrically connected to the junction capacitor 11 by contacts 33,34. It is obvious that in this way, for both embodiments of FIG. 6 and FIG. 7, the resonance circuit 110 is repeatedly placed on the wafer in the same regular pattern as the product 31.

The resonance circuit 110, which is integrated in the wafer, is used to determine the temperature of the wafer, for example, during a processing step in a semiconductor apparatus. For this purpose the actuating coil 3 is placed in the wafer holder, or chuck, of the semiconductor apparatus. For determining, for example, a radial distribution of the temperature of the wafer, actuating coils 3 are placed in a radial pattern in the holder. Other placement patterns can be devised also depending on the temperature non-uniformity on the wafer. The actuating coil 3 may extend over several products 31, depending on the size of the product 31, and hence over several resonance circuits 110, which are placed in the scribe line 32 of the wafer. Also, for the optimum operation of the actuating coil 3, the diameter of the actuating coil 3 should be larger than the distance between the actuating coil 3 and the top surface of the wafer.

Preferably the resonance frequency of the resonance circuit is different from a frequency encountered in the processing apparatus, in which the semiconductor substrate resides, so that appropriate filtering of the useful signals can take place. It is also possible to calibrate the response of the resonance circuit 110 prior to the start of the processing of the wafer in the semiconductor apparatus and/or to stop the processing of the wafer for a short time, measure the temperature, and subsequently continue the processing of the wafer in the semiconductor apparatus. Furthermore, it is preferable that the signal, which is induced over the pn-junction of the junction capacitor 11, does not initiate a forward bias of the pn-junction, because this would result in non-linear effects in the resonance circuit 110. This can be assured, for example, by keeping the bias on the actuating coil 3 sufficiently low.

Figure 8:
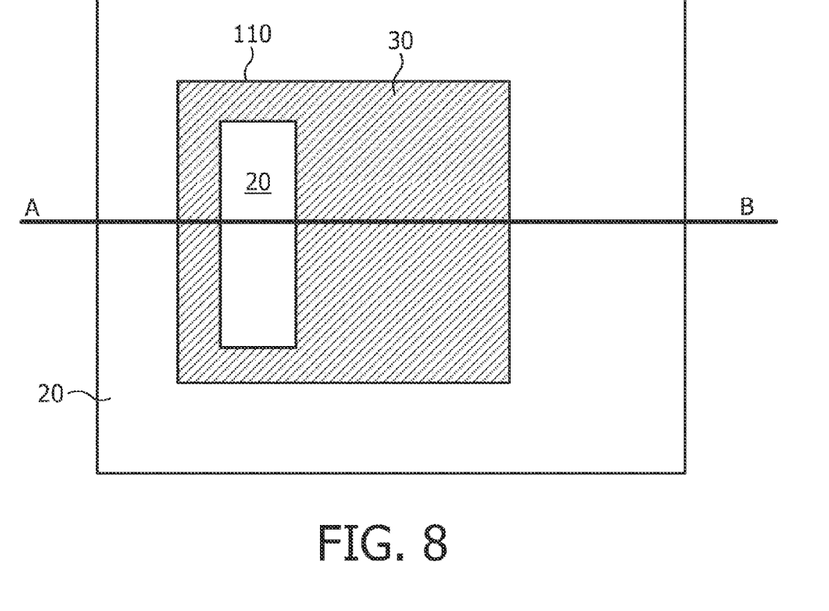
Figure 9:
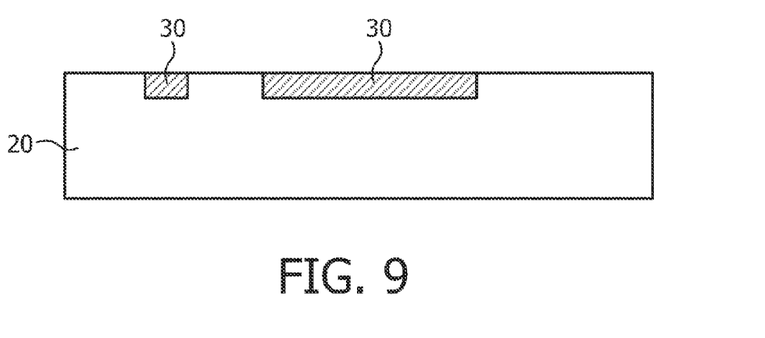
FIG. 9 is a cross-sectional view of the embodiment of the method according to the invention illustrated FIG. 8.
Figure 10:
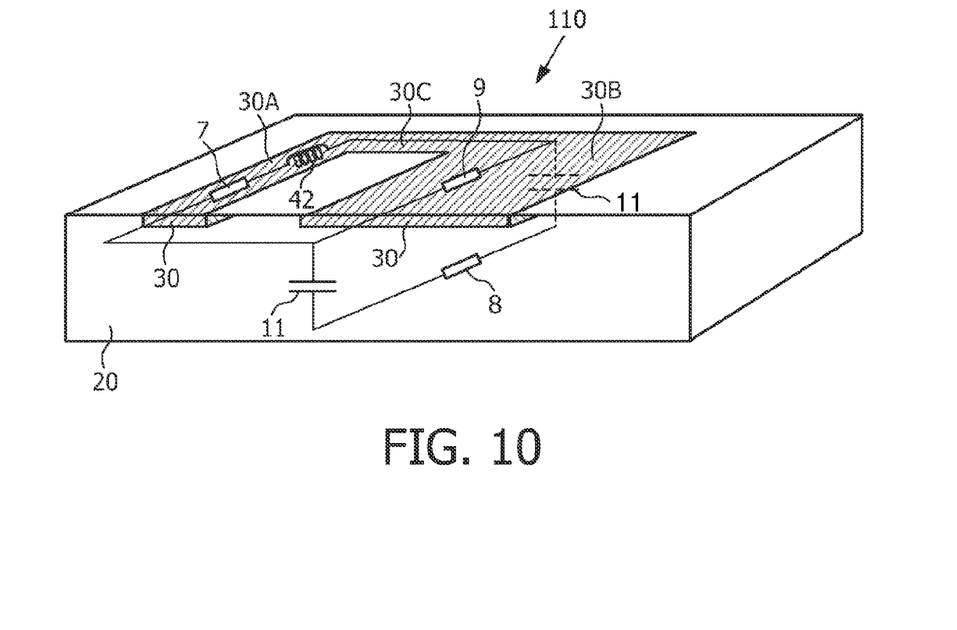
FIG. 10 is a perspective view of an embodiment of the method according to the invention.
Figure 11:
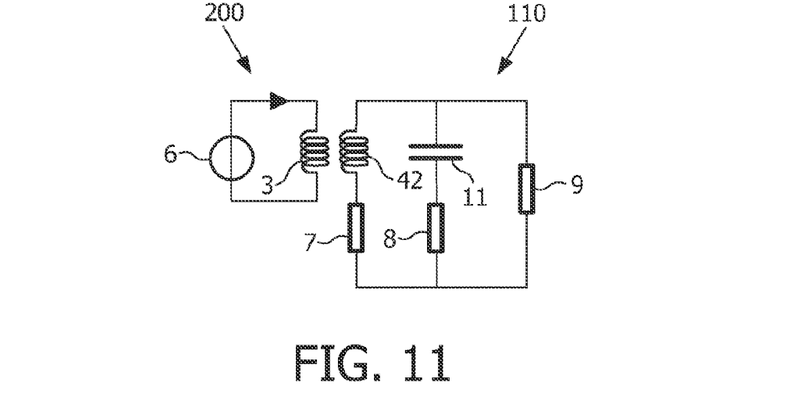
FIG. 11 is an electrical scheme of the embodiment of the method according to the invention illustrated in FIG. 10.

FIGS. 8-11 illustrate another embodiment of the resonance circuit 110 according to the invention. FIG. 8 shows a schematic top view of the semiconductor substrate with an n-type region 30 and the p-type substrate region 20. FIG. 9 illustrates a cross-sectional view along the line A-B of FIG. 8, with reference numerals that correspond to the same regions as in FIG. 8. FIG. 10 is a perspective view of the resonance circuit 110 viewed from a cross-section along the line A-B shown in FIGS. 8 and 9, showing a part of the n-type region 30 in the p-type substrate region 20. An electrical scheme is added to FIG. 10 to illustrate schematically how the n-type region 30 and the p-type substrate region 20 contribute to the resonance circuit 110. The n-type region 30 comprises a portion 30A and a portion 30B that are electrically connected via a portion 30C. Portion 30A of n-type region 30 has a smaller width than portion 30B and comprises the inductor 42 and a first series resistor 7. Portion 30B of n-type region 30 comprises a second series resistor 9 and forms, with the adjoining p-type substrate region 20, the junction capacitor 11. A third series resistor 8 is present in the p-type substrate region 20 below portion 30B of n-type region 30. FIG. 11 illustrates the electrical scheme of the resonance circuit 110, as shown in FIGS. 8-10, together with the actuator circuit 200. The response of the resonance frequency of the resonance circuit 110 to the temperature of the semiconductor substrate can be optimally tuned by choosing the capacitance value of the junction capacitor 11, the value of the inductor 42 and the value of the first, second and third series resistors 7,8,9 which determine also the value of the damping of the resonance circuit 110.

Figure 12:
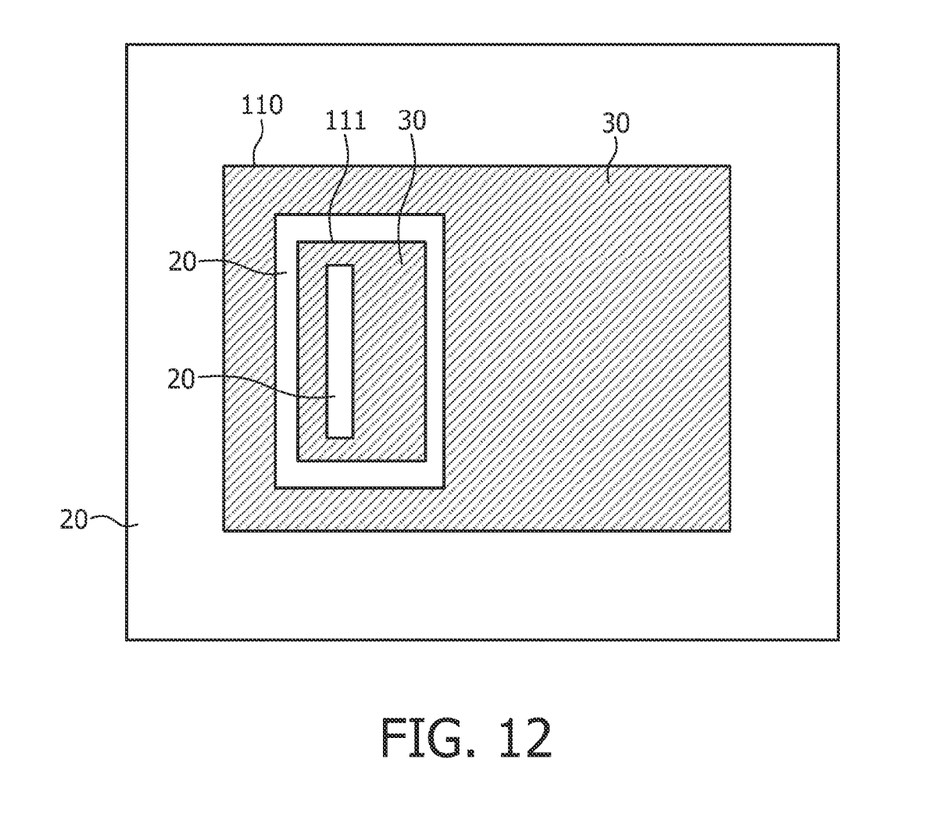

Optionally a second resonance circuit 111 can be placed such that it is surrounded by the resonance circuit 110, as is illustrated in the schematic top view of FIG. 12, thereby adding series resistors, inductors and capacitors to the series resistors 7,8,9, the inductor 42 and the junction capacitor 11. Another option is to place resonance circuits adjacent to each other.

Figure 13:
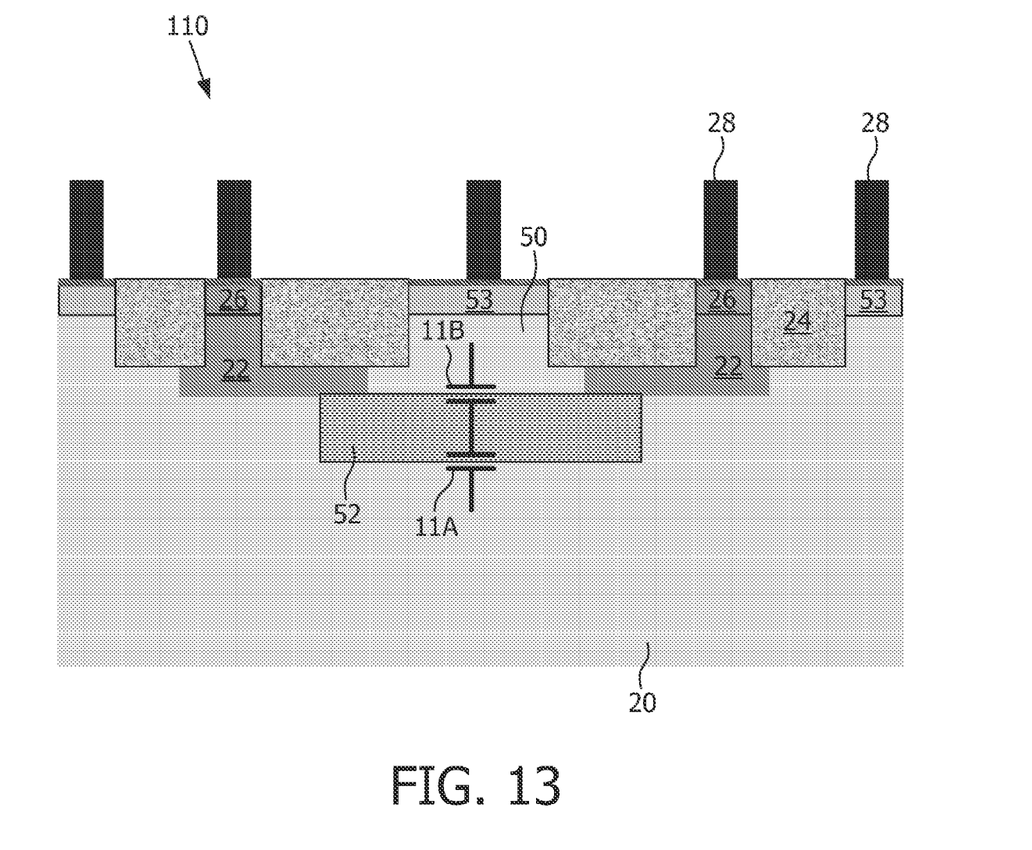
FIG. 13 is a cross-sectional view illustrating an embodiment of the method according to the invention.

FIG. 13 illustrates another embodiment of the resonance circuit 110 in which the junction capacitor comprises two pn-junction capacitors 11A and 11B, which are formed by the buried n-type region 52, the p-type substrate region 20 and a further p-type region 50, which may, for example, be a part of the p-type substrate region 20. The n-type region 52 is electrically connected to conductive regions 28 via the n-type well region 22 and the n-type regions 26. The p-type substrate region 20 and the further p-type region 50 are electrically connected to the conductive regions 28 via the p-type regions 53. The conductive regions 28 are connected to both ends of the flat coil 12 (not shown). This embodiment of the junction capacitor 11 provides for an advantageous increase of the junction area by using a bottom and a top side of the buried n-type region 52 as junction areas. The increase of the junction area results in an increase of the capacitance value of the junction capacitor 11 and hence increases the accuracy of the determination of the temperature of the semiconductor substrate.

It is obvious that various embodiments of the junction capacitor 11 are possible by using available processing steps in a standard semiconductor technology, such as CMOS (Complementary Metal Oxide Semiconductor) or BiCMOS (Bipolar CMOS). For example, lightly doped junctions can be formed as part of the junction capacitor 11 by applying the threshold voltage implants used for CMOS transistors.

In summary, the invention provides a method and a device for determining the temperature of a semiconductor substrate. A resonance circuit is provided on the semiconductor substrate and is formed by a junction capacitor and an inductor. The substrate is placed on a holder and the resonance circuit is irradiated with electromagnetic energy of an electromagnetic field generated by a radiation device. A resonance frequency of the resonance circuit is determined by detecting an effect of the resonance circuit on the irradiated electromagnetic field, and a temperature of the semiconductor substrate is determined as a function of the resonance frequency. The method and device according to the invention provide for a more accurate determination of the temperature of the semiconductor substrate due to an increased sensitivity to the temperature of the junction capacitor.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim. The word "a" or "an" preceding an element does not exclude the presence of a plurality of such elements.

The invention claimed is:

1. A method for determining the temperature of a semiconductor substrate, the method comprising the steps of:
providing a resonance circuit on the semiconductor substrate, the resonance circuit comprising a junction capacitor and an inductor;
irradiating the resonance circuit with electromagnetic energy of an electromagnetic field generated by a radiation device;
determining a resonance frequency of the resonance circuit by detecting an effect of the resonance circuit on the electromagnetic field; and
determining a temperature for the semiconductor substrate as a function of said resonance frequency.

2. A method as claimed in claim 1, wherein the substrate is placed on a holder that comprises the radiation device before irradiating the resonance circuit with electromagnetic energy.

3. A method as claimed in claim 1, wherein the radiation device comprises an actuating coil having a diameter that is larger than a distance between a top surface of the semiconductor substrate and the actuating coil.

4. A method as claimed in claim 1, wherein the radiation device comprises an actuating coil that extends over at least two resonance circuits.

5. A method as claimed in claim 1, wherein the temperature of the semiconductor substrate is determined during processing of the semiconductor substrate in a semiconductor processing apparatus, and the resonance frequency of the resonance circuit differs from a frequency generated by the semiconductor processing apparatus.

6. A method as claimed in claim 1, wherein the junction capacitor is reverse biased.

7. A method as claimed in claim 6, wherein the reverse bias is provided by the radiation device.

8. A device for measuring the temperature of a semiconductor substrate, the device comprising a resonance circuit on a semiconductor substrate with a resonance frequency that is sensitive to temperature variations of the semiconductor substrate, in which the resonance circuit comprises a junction capacitor and an inductor.

9. A device as claimed in claim 8, in which the junction capacitor and the inductor are formed by a first region of a first semiconductor type adjoining a second region of a second semiconductor type, which is opposite to the first semiconductor type.

10. A device as claimed in claim 9, in which the first region is at the surface of the semiconductor substrate and comprises, seen in projection at the surface of the substrate, a first portion, a second portion and connection portions wherein the second portion is wider than the first portion and wherein both portions are connected to each other at their respective ends via the connection portions.

11. A device as claimed in claim 10, in which a further resonance circuit is provided in between the first portion, the second portion and the connection portions of the first region.

12. A device as claimed in claim 8, wherein the junction capacitor comprises a first and a second junction capacitor with a common region of a first semiconductor type, wherein the first junction capacitor is formed by the common region and a first capacitor region of a second semiconductor type, opposite to the first semiconductor type, and wherein the second junction capacitor is formed by the common region and a second capacitor region of the second semiconductor type.

13. A device as claimed in claim 8, wherein the semiconductor substrate comprises a wafer having products separated by a scribe line and wherein the resonance circuit is formed in the scribe line.

* * * * *